UNITED STATES PATENT OFFICE.

ALBERT W. HARRISON, OF BALTIMORE, MARYLAND.

SOLUTION FOR TREATING ELECTROTYPE-MOLDS.

No. 901,966.

Specification of Letters Patent.

Patented Oct. 27, 1908.

Application filed December 7, 1906. Serial No. 346,703.

*To all whom it may concern:*

Be it known that I, ALBERT W. HARRISON, a citizen of the United States, residing at Baltimore, in the State of Maryland, have invented certain new and useful Improvements in Solutions for Treating Electrotype-Molds, of which the following is a specification.

My invention relates to the preparation of electrotype molds for the electrolytic bath and consists in an improved composition or solution for use in such preparation.

The present, almost universal, method of preparing electrotype molds involves much time, labor and expense. The wax of which the mold is formed is first dusted with graphite, the impression made therein, the high places removed with a sharp knife and the mold placed in a machine and for a long time again dusted with graphite. After this, the process is varied somewhat the most frequently used steps involving the treatment of the dusted mold with sulfate of copper, iron-filings, wood alcohol and other substances, and thoroughly washing the mold after this treatment as a final preparatory step prior to placing the mold in the electrolytic bath.

My invention dispenses with the use of the sulfate of copper, iron-filings, wood alcohol, and other substances used in the old process and the long, dirty, and expensive graphite dusting in the machine, the mold, in the practice of my process requiring no further treatment after the original dusting, impression, and trimming except to lightly brush over the trimmed spaces with graphite and to treat it with my improved solution, when it is not only ready for the electrolytic bath, but the effect of the use of my solution is such that the action of the electrolytic bath is accelerated, and the effect greatly improved.

My improved solution is formed by dissolving a soluble mineral salt, especially a sulfate, chlorid, or nitrate of a mineral substance in water and mixing graphite therewith, the proportions being substantially one gallon of water to a half pound, more or less, of the salt and one pound, more or less, of graphite.

In carrying out my invention the mold, after the preliminary dusting with graphite, impressing, trimming and redusting the trimmed spaces, which is always done by hand with a brush, is subjected to my solution, either by sprinkling, pouring, pumping, or any approved means, it only being necessary to good results that every portion of the surface of the mold be thoroughly treated. No further preparation is necessary, the treatment with the solution serving to coat the surface of the mold with a preparatory film of metal, and the mold is at once subjected to the electrolytic bath, the action of which is much quicker and more perfect than with the old methods.

While I may, with moderate success, use several of the class of mineral salts hereinbefore mentioned, I prefer to use nitrate of soda as possibly giving the best results.

The trimming off of the high spaces of the mold after impressing the form therein is not absolutely essential and may, in some cases, be dispensed with, thus obviating the secondary hand dusting with graphite to cover raw places on the mold.

What I claim as new is:—

1. The hereindescribed solution for treating electrotype molds consisting of nitrate of soda dissolved in water with graphite added thereto, all in substantially the proportions named.

2. An improved solution for treating electrotype molds prior to submitting them to the electrolytic bath, comprising as its principal ingredient nitrate of soda dissolved in water in substantially the proportions named.

In testimony whereof I affix my signature in presence of two witnesses.

ALBERT W. HARRISON.

Witnesses:
ANDREW S. MCNEIR,
CHAS. E. HARRISON.